United States Patent
Egashira et al.

(10) Patent No.: US 11,719,331 B2
(45) Date of Patent: Aug. 8, 2023

(54) CONTROL METHOD AND CONTROL DEVICE FOR VEHICULAR AUTOMATIC TRANSMISSION AND RECORDING MEDIUM

(71) Applicant: Honda Motor Co., Ltd., Tokyo (JP)

(72) Inventors: Fumio Egashira, Tokyo (JP); Ryota Yamasaki, Tokyo (JP); Tomoyuki Noguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/694,717

(22) Filed: Mar. 15, 2022

(65) Prior Publication Data

US 2022/0316589 A1    Oct. 6, 2022

(30) Foreign Application Priority Data

Mar. 31, 2021   (JP) ................ 2021-062005

(51) Int. Cl.
   *F16H 61/14*   (2006.01)
   *F16H 59/46*   (2006.01)
   *F16H 59/18*   (2006.01)

(52) U.S. Cl.
   CPC .......... *F16H 61/143* (2013.01); *F16H 59/18* (2013.01); *F16H 59/46* (2013.01); *F16H 2059/186* (2013.01); *F16H 2059/467* (2013.01); *F16H 2061/145* (2013.01)

(58) Field of Classification Search
   CPC .. F16H 61/12; F16H 61/143; F16H 2061/145; F16H 2061/146; F16H 2061/147; F16H 59/18; F16H 59/46; F16H 2059/186; F16H 2059/467
   See application file for complete search history.

(56) References Cited

U.S. PATENT DOCUMENTS

2010/0137100 A1* 6/2010 Kojima ................. F16H 61/143
                                                                477/64
2020/0049251 A1* 2/2020 Iizumi ..................... F16H 61/12

FOREIGN PATENT DOCUMENTS

| JP | H11280886 | 10/1999 |
| JP | 5060512 | 10/2012 |
| JP | 2016048073 | 4/2016 |
| JP | 2016217457 | 12/2016 |

OTHER PUBLICATIONS

"Office Action of Japan Counterpart Application", dated Jan. 10, 2023, with English translation thereof, pp. 1-4.

* cited by examiner

*Primary Examiner* — Lori Wu
(74) *Attorney, Agent, or Firm* — JCIPRNET

(57) ABSTRACT

The disclosure provides a control method, a control device for vehicular automatic transmission, and a recording medium. The control device includes an ON/OFF control solenoid controlling LC to either ON or OFF, and an LC pressure control linear solenoid controlling LC pressure between a released state and a fully engaged state. The control device acquires, when an accelerator pedal opening of a vehicle is on a deceleration side in a fully closed state, a torque converter slip ratio when the ON/OFF control solenoid maintains ON for a predetermined time period and the LC pressure control linear solenoid is controlled such that the LC pressure is OFF, and determines whether or not the second solenoid has a high-pressure fixation failure according to whether or not the slip ratio is within a predetermined range from a slip reference value.

14 Claims, 5 Drawing Sheets

CONTROL METHOD AND CONTROL DEVICE FOR VEHICULAR AUTOMATIC TRANSMISSION AND RECORDING MEDIUM

CROSS-REFERENCE TO RELATED APPLICATION

This application claims the priority benefits of Japanese application no. 2021-062005, filed on Mar. 31, 2021. The entity of the above-mentioned patent application is hereby incorporated by reference herein and made a part of this specification.

BACKGROUND

Technical Field

The disclosure relates to a control technology for an automatic transmission that includes a torque converter including a lock-up clutch, and more particularly to a control technology for detecting the failure of a solenoid that controls the engagement pressure of a lock-up clutch.

Related Art

In an automatic transmission including a torque converter, the transmission efficiency of power is improved by engaging the lock-up clutch (LC) in the torque converter in a predetermined operating region of the vehicle, thereby improving the fuel consumption rate (fuel efficiency) of the vehicle. However, while lock-up improves transmission efficiency, it also tends to cause shocks and other problems that impair driving comfort. Therefore, in addition to simply connecting (ON) or releasing (OFF) the lock-up clutch, slip ratio control is used to vary slip ratio (ETR) from 0% (released state) to 100% (fully engaged state). The slip ratio ETR of the torque converter (torque converter slip ratio) is acquired by dividing Ni, the rotation speed of the output side of the torque converter, by Ne, the rotation speed of the input side (rotation speed of the engine crankshaft). The slip ratio control is performed by the LC pressure control valve adjusting the engagement pressure of the lock-up clutch (hereinafter referred to as LC pressure).

For the ON/OFF control of the lock-up clutch, for example, in order to avoid engine stall when the vehicle is decelerating, a method of determining when to turn off (release) the lock-up clutch by using the slip ratio of the torque converter, vehicle speed, and rotation speed of the input shaft of the automatic transmission as parameters has been proposed in Patent Literature 1.

The LC pressure control valve is driven by an electromagnetically actuated linear solenoid and may control the slip ratio described above, which will be described in detail later. Therefore, when the linear solenoid LC pressure control fails and the slip ratio cannot be controlled, not only will power transmission efficiency deteriorate as described above, but also the driving comfort will be greatly impaired. For example, if the slip ratio of the lock-up clutch remains high even after the power of the linear solenoid is turned off, for example, being fixated in a fully engaged state, it will always be directly connected in the region where the lock-up clutch is ON (engaged), causing vibration and greatly impairing driving comfort. Furthermore, when the lock-up clutch is engaged, a large shock or the like may occur, which may cause engine stall. Therefore, several methods have been proposed to detect such an on-stack (fixation) failure of the linear solenoid for LC pressure control.

For example, according to the control method disclosed in Patent Literature 2, whether or not there is an on-stack failure is determined by monitoring the change in the actual torque converter slip ratio within a certain period of time, focusing on the fact that the swinging of the vehicle body caused by the sudden engagement of the lock-up clutch is reflected in the change in the ratio of the rotation speed on the output side to that of the input side of the torque converter (actual torque converter slip ratio).

RELATED ART

Patent Literature

[Patent Literature 1] Japanese Patent No. 5060512
[Patent Literature 2] Japanese Unexamined Patent Publication No. 2016-217457

However, the method described in Patent Literature 2 cannot be applied to vehicles in which the actual torque converter slip ratio does not change in the same way because the on-stack failure is detected by monitoring how the actual torque converter slip ratio changes. Patent Literature 2 exemplifies a vehicle including a stepless gear change device known as a CVT (Continuously Variable Transmission), but in a multi-speed vehicle, for example, it may not be possible to detect an on-stack failure from the variations of the actual torque converter slip ratio due to differences in the lock-up clutch mechanism and controllability.

An object of disclosure is to provide a control method and a control device for vehicular automatic transmission capable of reliably detecting a high-pressure fixation failure of a solenoid for controlling a lock-up clutch (LC) pressure.

SUMMARY

When an accelerator pedal is on a deceleration side that is turned off, a slip ratio ETR or slip amount when the lockup clutch is instructed to maintain in an engaged (ON) state and the engaging pressure (LC pressure) is instructed to be turned off is monitored. As a result, it is possible to reliably diagnose whether or not the linear solenoid for LC pressure control has a high-pressure fixation failure, without being affected by differences in the lock-up clutch mechanism, controllability, and the like.

According to a first aspect of the disclosure, a control device for vehicular automatic transmission includes a torque converter including a lock-up clutch. The control device includes: a first solenoid controlling the lock-up clutch to either an engaged state or a non-engaged state; a second solenoid controlling an engagement pressure of the lock-up clutch between a released state and a fully engaged state; and a control unit controlling the first solenoid and the second solenoid according to a traveling state of a vehicle. The control unit acquires, when an accelerator pedal opening of the vehicle is on a deceleration side in a fully closed state, a slip ratio or a slip amount of the torque converter when the first solenoid is controlled to maintain in the engaged state for a predetermined time period and when the second solenoid is controlled such that the engaging pressure changes to a predetermined low pressure including the released state; and determines whether or not the second solenoid has a high-pressure fixation failure according to whether or not the slip ratio or the slip amount is within a predetermined range from a slip reference value.

According to a second aspect of the disclosure, a control method for a control device for vehicular automatic transmission includes a torque converter including a lock-up clutch. The control device includes a first solenoid controlling the lock-up clutch to either an engaged state or a non-engaged state; and a second solenoid controlling an engagement pressure of the lock-up clutch between a released state and a fully engaged state. The control method includes: acquiring, when an accelerator pedal opening of the vehicle is in on a deceleration side in a fully closed state, a slip ratio or a slip amount of the torque converter when the first solenoid is controlled to maintain in the engaged state for a predetermined time period and when the second solenoid is controlled such that the engaging pressure changes to a predetermined low pressure including the released state; and determines whether or not the second solenoid has a high-pressure fixation failure according to whether or not the slip ratio or the slip amount is within a predetermined range from a slip reference value.

According to a third aspect of the disclosure, a recording medium stores a program, functioning a computer as a control device for vehicular automatic transmission that includes a torque converter including a lock-up clutch. The control device includes a first solenoid controlling the lock-up clutch to either an engaged state or a non-engaged state; and a second solenoid controlling an engagement pressure of the lock-up clutch between a released state and a fully engaged state. The program realizes a function of acquiring, when an accelerator pedal opening of a vehicle is on a deceleration side in a fully closed state, a slip ratio or a slip amount of the torque converter when the first solenoid is controlled to maintain in the engaged state for a predetermined time period and when the second solenoid is controlled such that the engaging pressure changes to a predetermined low pressure including the released state; and a function of determining whether or not the second solenoid has a high-pressure fixation failure according to whether or not the slip ratio or the slip amount is within a predetermined range from a slip reference value.

According to the first to third aspects described above, by maintaining the ON (engaged) state of the lock-up clutch (LC) on the deceleration side when the accelerator pedal is OFF and monitoring the slip ratio ETR or slip amount when the LC pressure is set to a low pressure including OFF, it is possible to reliably diagnose a high-pressure fixation failure of the second solenoid that controls the LC pressure of the lock-up clutch without being affected by the difference in the lock-up clutch mechanism or the difference in controllability.

Further, it is desirable that the slip ratio or slip amount of the torque converter is calculated from the rotation speed of the input shaft and the rotation speed of the output shaft of the torque converter, and the slip reference value is set to a value corresponding to the slip ratio or the slip amount when the lock-up clutch is fully engaged. By comparing the calculated slip ratio and the like with the slip reference value at the time of complete engaging, it is possible to reliably diagnose a high-pressure fixation failure.

Moreover, the second solenoid may be determined to have a high-pressure fixation failure if the slip ratio or the slip amount acquired when the first solenoid is controlled to maintain the engaged state and when the second solenoid is controlled such that the engaging pressure is in the released state is within a predetermined range from the slip reference value. By acquiring the slip ratio and the like when the second solenoid is controlled such that the LC pressure is in the released state, the difference in the slip ratio and the like between the normal time and the failure time increase, and more reliable diagnosis of high-pressure fixation failure becomes possible.

The control device may maintain the first solenoid in the engaged state for the predetermined time period from a time when the first solenoid should be switched to the non-engaged state when a predetermined condition is satisfied when the accelerator pedal opening is on the deceleration side in a fully closed state. On the deceleration side, for example, when the lock-up clutch is controlled to be disengaged when the vehicle speed becomes lower than the predetermined speed, high-pressure fixation failure diagnosis may be performed by maintaining the engaged state for a predetermined time period, and reliable failure diagnosis may be performed without significantly changing the running state.

DESCRIPTION OF THE EMBODIMENTS

Hereinafter, an embodiment of disclosure will be described in detail with reference to the drawings. The control device according to disclosure is realized by an electronic control unit (ECU) that controls at least the entire automatic transmission. In the present embodiment, it is configured by an FI-ECU that controls an engine and an AT-ECU that controls an automatic transmission, but it may also be configured by an electronic control unit (ECU) that is integrally provided as a control device for the automatic transmission. It should be noted that the components described in the following embodiments are merely examples, and the technical scope of disclosure is not limited thereto.

1. Vehicle Drive System

Figure 1:
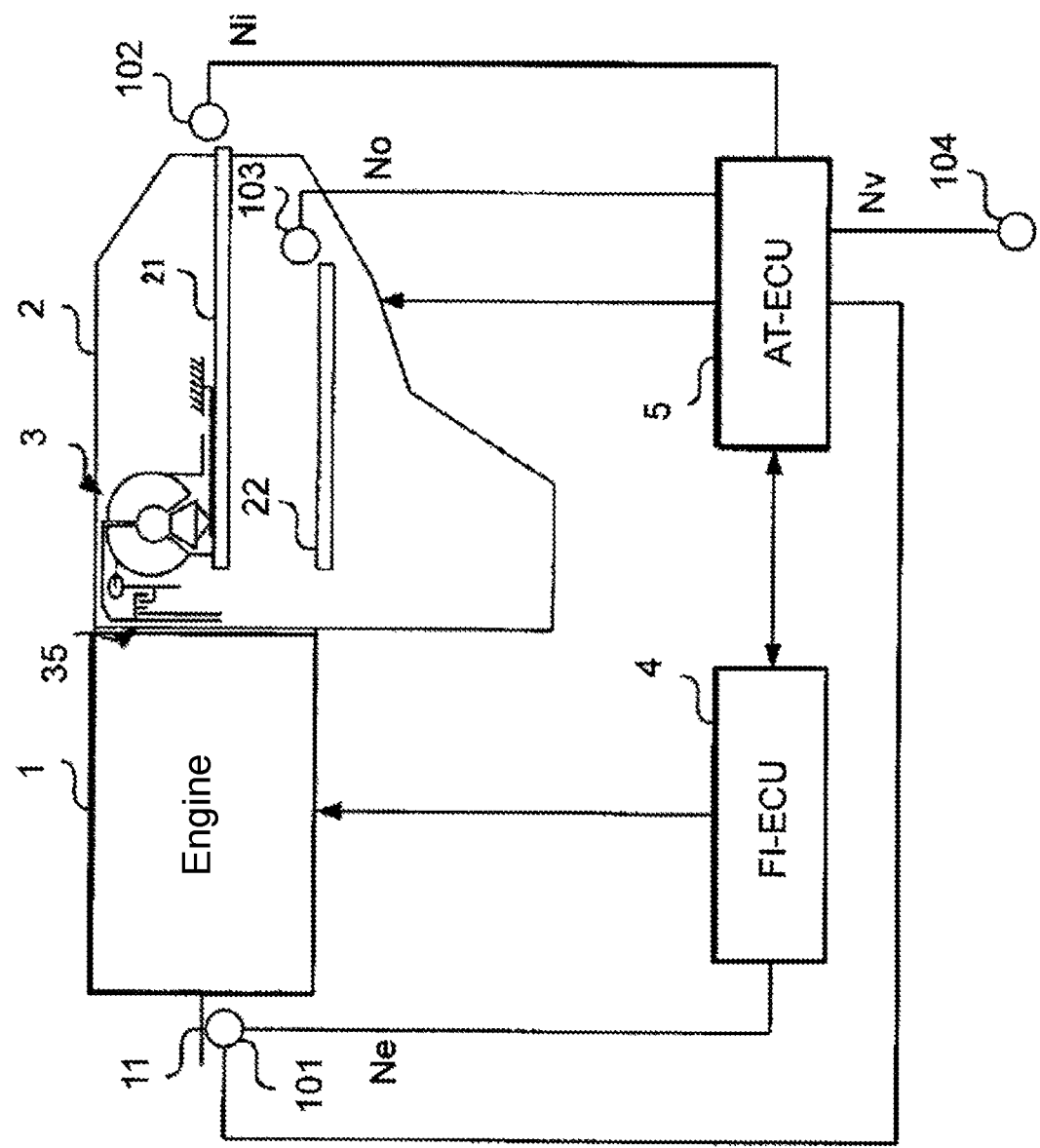
FIG. 1 is a block diagram schematically showing an example of a drive system of an automatic transmission vehicle to which a control device according to an embodiment of disclosure is applied.

As shown in FIG. 1, the vehicle to which the control device according to the present embodiment is applied includes an engine 1, an automatic transmission 2, a torque converter 3 in the automatic transmission 2, an FI-ECU 4 that controls the engine 1, and an AT-ECU 5 that controls the automatic transmission 2 including the torque converter 3. The automatic transmission 2 is connected to the engine 1 via the torque converter 3, and the torque converter 3 includes a lock-up clutch 35.

The rotational output of the engine 1 is output to a crankshaft (output shaft of the engine 1) 11. The rotation of the crankshaft 11 is transmitted to a main shaft 21 of the automatic transmission 2 via the torque converter 3. The rotational torque of the main shaft 21 is transmitted to a counter shaft 22 via a clutch and gears (not shown), and the rotational torque of the counter shaft 22 is transmitted to a drive wheel via the gears and a differential mechanism (not shown).

An engine rotation speed sensor 101 for detecting a rotation speed Ne of the crankshaft 11 (the engine 1) is provided in the vicinity of the crankshaft 11. A main shaft rotation speed sensor 102 for detecting a rotation speed Ni of the main shaft 21 is provided in the vicinity of the main shaft 21. A counter shaft rotation speed sensor 103 for detecting a rotation speed No of the counter shaft 22 is provided in the vicinity of the counter shaft 22. The AT-ECU 5 inputs data of rotation speed Ne, Ni, and No from the rotation speed sensors 101 to 103, respectively, and controls the torque converter 3 and the lock-up clutch 35 in the automatic transmission 2 as described later. Further, the FI-ECU 4 inputs rotation speed data from the engine rotation speed sensor 101 to control the engine 1.

Further, a vehicle speed sensor 104 for detecting a vehicle speed Nv of the vehicle is provided at a predetermined position of the vehicle. The vehicle speed Nv may be calculated from the rotation speed Ni of the main shaft 21 or the rotation speed No of the counter shaft 22 without providing the vehicle speed sensor 104 that specifically detects the vehicle speed Nv. For example, the vehicle speed Nv may be calculated based on a formula such as "Nv=Ni× gear shift ratio×tire circumference" or "Nv=No×tire circumference".

2. Torque Converter

The configuration of the torque converter 3 will be briefly described with reference to FIG. 2. The torque converter 3 transmits torque via a fluid (hydraulic oil). The torque converter 3 includes a front cover 31; a pump impeller 32 integrally formed with the front cover 31; a turbine impeller (turbine runner) 33 arranged opposite to the pump impeller 32 between the front cover 31 and the pump impeller 32; and a stator 34 interposed between the pump impeller 32 and a turbine impeller 33 and supported on a fixed shaft 37 via a one-way clutch 36. As shown in FIG. 1, the crankshaft 11 is connected to the pump impeller 32 of the torque converter 3 via the front cover 31, and the turbine impeller 33 is connected to the main shaft (input shaft of the automatic transmission 2) 21.

Further, the lock-up clutch 35 is provided between the turbine impeller 33 and the front cover 31. The lock-up clutch 35 performs ON/OFF control by a hydraulic control system 6 and slip ratio control by LC pressure based on the command of the AT-ECU 5. That is, the lock-up clutch 35 engages with the front cover 31 by being pressed toward an inner surface of the front cover 31, and is released from engagement with the front cover 31 when the pressure is released.

When the lock-up clutch 35 is OFF (released/disengaged), the relative rotation of the pump impeller 32 and the turbine impeller 33 is allowed. In this state, when the rotational torque of the crankshaft 11 is transmitted to the pump impeller 32 via the front cover 31, the hydraulic oil filling the container of the torque converter 3 is circulated, by the rotation of the pump impeller 32, from the pump impeller 32 to the turbine impeller 33 and then to the stator 34. As a result, the rotational torque of the pump impeller 32 is transmitted to the turbine impeller 33 to drive the main shaft 21.

On the other hand, when the lock-up clutch 35 is ON (direct connection/engagement), instead of rotating from the front cover 31 to the turbine impeller 33 via hydraulic oil, the front cover 31 and the turbine impeller 33 rotate integrally, and the rotational torque of the crankshaft 11 is directly transmitted to the main shaft 21. However, as described above, the LC pressure (engaging pressure) of the lock-up clutch 35 may change the slip ratio ETR of the torque converter from 0% (released state) to 100% (fully engaged state). The LC pressure control will be described later. Further, as already described, the slip ratio ETR (%) of the torque converter is calculated by the following equation.

$$ETR(\%) = (\text{main shaft rotation speed Ni of automatic transmission}/\text{engine rotation speed Ne}) \times 100$$

3. The Hydraulic Control System of Lock-Up Clutch

Figure 2:
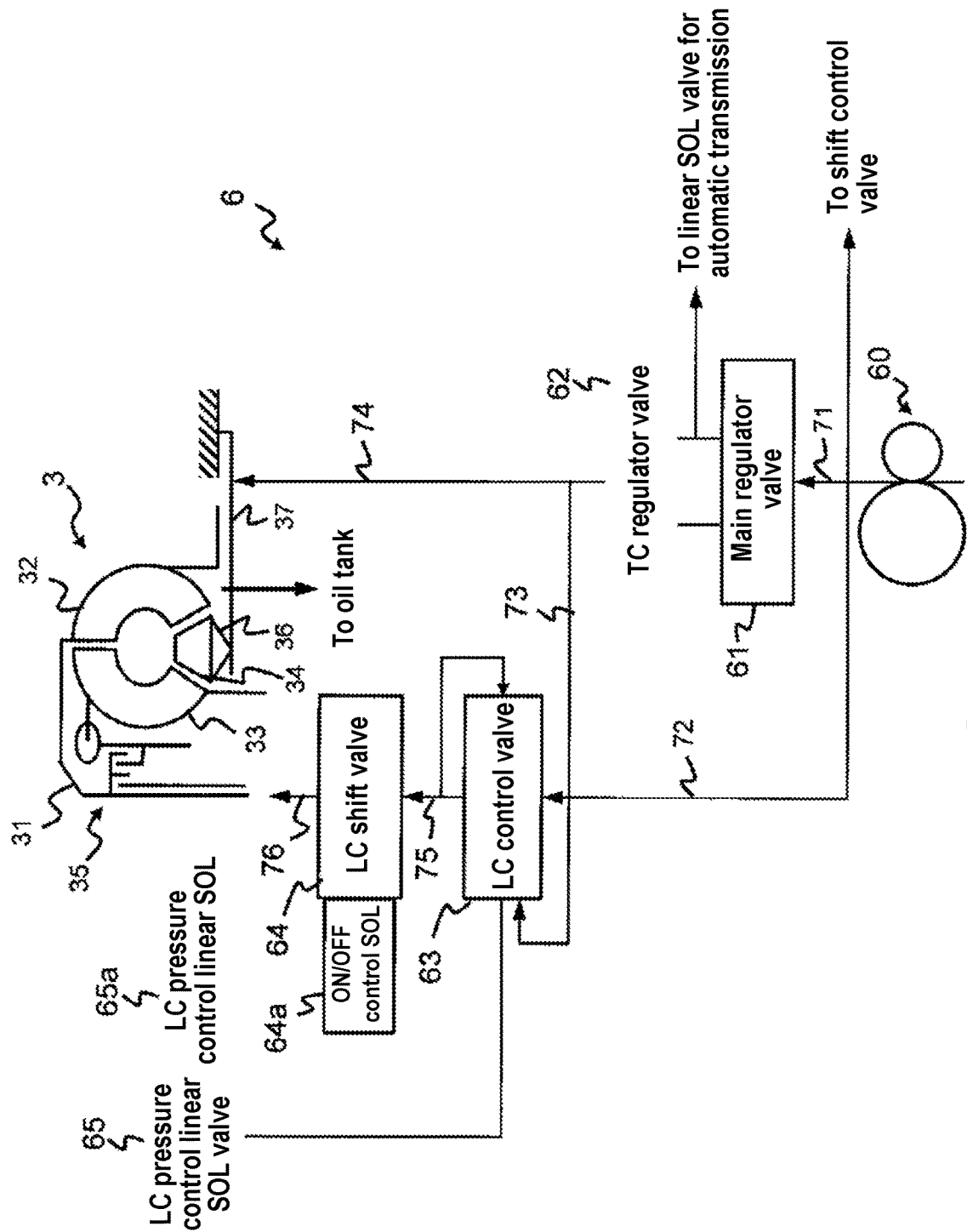
FIG. 2 is a block diagram schematically showing part of a hydraulic control of a torque converter to which a control device according to an embodiment is applied.

As shown in FIG. 2, the hydraulic control system 6 includes a hydraulic pump 60 for supplying hydraulic oil to the entire hydraulic control system 6. The hydraulic pump 60 is driven by the engine 1 to pump hydraulic oil stored in an oil tank (not shown) and pump it to a main regulator valve 61 via an oil passage 71.

The main regulator valve 61 regulates the hydraulic oil pumped from the hydraulic pump 60 to generate a line pressure PL. The hydraulic oil having the line pressure PL regulated by the main regulator valve 61 is supplied to a torque converter (TC) regulator valve 62 and also to a linear solenoid valve or the like (not shown) for the automatic transmission 2. Hereinafter, for the sake of simplicity, the "solenoid" is abbreviated as "SOL" as appropriate.

Further, the hydraulic oil having the line pressure PL regulated by the main regulator valve 61 is supplied to a CR valve (not shown). The CR valve reduces the line pressure PL of the hydraulic oil to generate a CR pressure (control pressure), and supplies the hydraulic oil of the CR pressure to each linear SOL valve.

The TC regulator valve 62 controls the supply of hydraulic oil to the torque converter 3, and the hydraulic oil having the line pressure PL supplied from the main regulator valve 61 is supplied to a lock-up (LC) control valve 63 via an oil passage 73. Further, the TC regulator valve 62 supplies the hydraulic oil having the line pressure PL to the inside of the torque converter 3 from the back side via an oil passage 74.

The LC control valve 63 supplies the hydraulic oil having the line pressure PL supplied through an oil passage 72 to a LC shift valve 64 via an oil passage 75. The hydraulic oil having the line pressure PL supplied in this way is used for lock-up control of the torque converter 3 via the LC shift valve 64.

The LC shift valve 64 controls the engagement (ON)/release (OFF) of the lock-up clutch 35 by an ON/OFF control SOL 64a. When the LC shift valve 64 is opened by excitation energizing (ON) the ON/OFF control SOL 64a, the hydraulic oil is supplied from the front side of the lock-up clutch 35 via the LC shift valve 64 and an oil passage 76. The hydraulic oil is discharged to the oil tank from the back side of the lock-up clutch 35. As a result, the lock-up clutch 35 is engaged.

On the other hand, when the LC shift valve 64 is closed by turning off the ON/OFF control SOL 64a and the hydraulic oil is discharged from the front side to the oil tank, the lock-up clutch 35 is turned off (released/disengaged).

A LC pressure control linear SOL valve 65 generates an output pressure determined according to the excitation control of a LC pressure control linear SOL 65a and acts on the LC control valve 63. As a result, the hydraulic oil having the line pressure PL supplied from the main regulator valve 61 is regulated to the LC pressure required for lock-up control by the LC control valve 63. As a result, the LC pressure of the lock-up clutch 35 is controlled from the released state to the fully engaged state according to the excitation energization amount of the LC pressure control linear SOL 65a.

Therefore, the excitation energization amount of the LC pressure control linear SOL 65a may be a command value for LC pressure control.

When releasing the ON (engaged) state of the lock-up clutch 35, the ON/OFF control SOL 64a is turned OFF and the command value of the LC pressure control linear SOL 65a is set to 0.

When a high-pressure fixation failure occurs in which the LC pressure control linear SOL 65a that operates in this way is fixated on the high-pressure side, the driving comfort is deteriorated described above, therefore it is necessary to immediately release (OFF) the lock-up clutch 35. According to the present embodiment, a quick response can be made by reliably detecting a high-pressure fixation failure of the LC pressure control linear SOL 65a by the method described below. Hereinafter, the control for detecting the high-pressure fixation failure according to the present embodiment will be described in detail.

4. Lock-Up Clutch Controller

Figure 3:
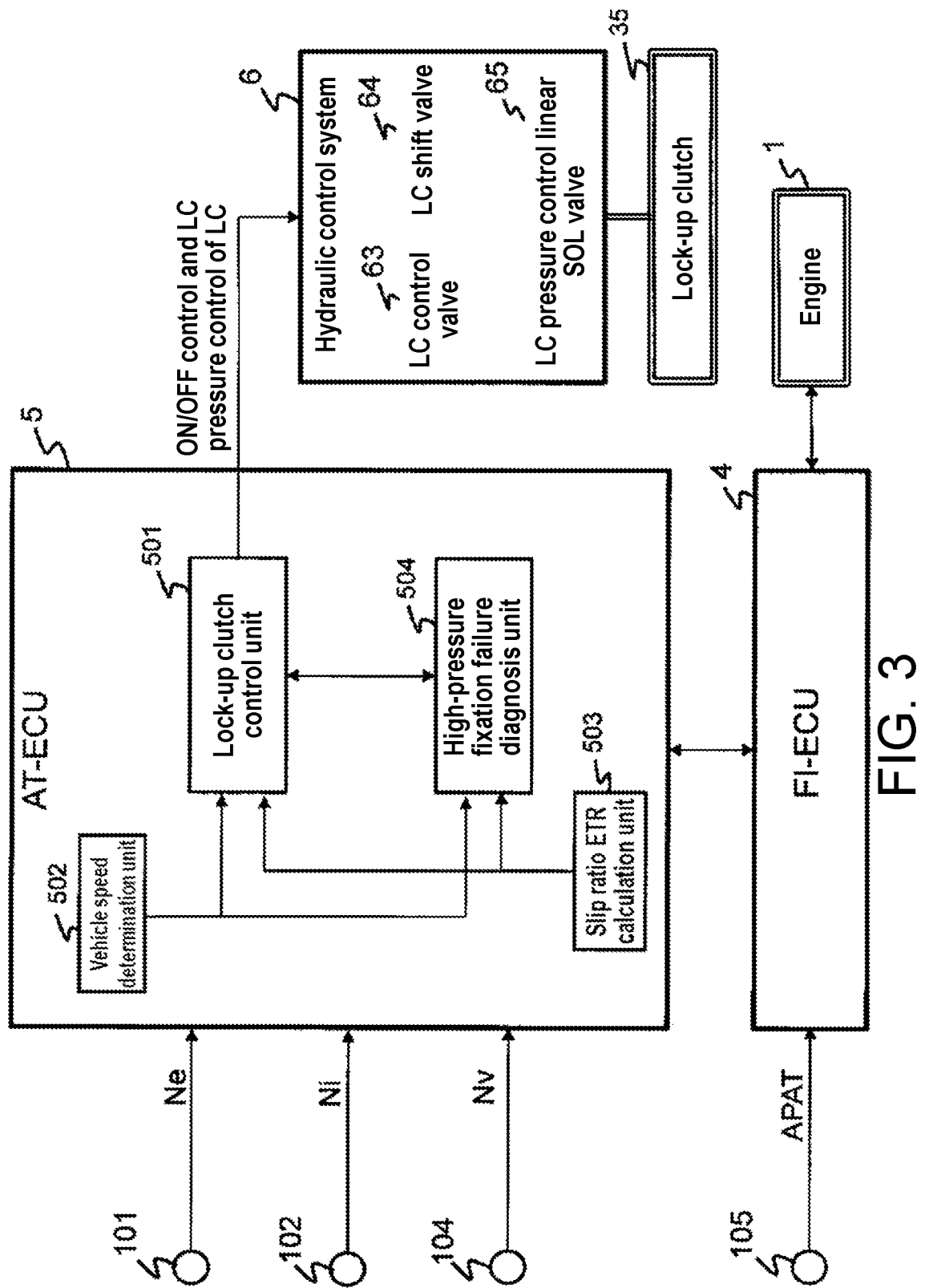
FIG. 3 is a block diagram schematically showing a functional configuration of a control device according to an embodiment.

As shown in FIG. 3, the FI-ECU 4 and the AT-ECU 5 are configured by a processor such as a CPU (Central Processing Unit) and the like, and may execute the fuel cut control and the control of the automatic transmission 2 including the lock-up clutch 35 by executing a program stored in the memory (not shown).

The FI-ECU 4 executes a fuel cut that cuts off the fuel supply to the engine 1 based on the satisfaction of a predetermined condition while the vehicle is decelerating. The predetermined condition includes that an accelerator pedal opening APAT is fully closed by an accelerator pedal opening sensor 105.

The AT-ECU 5 according to the present embodiment inputs the engine rotation speed Ne, the main shaft rotation speed Ni of the automatic transmission 2, and the vehicle speed Nv, and controls the lock-up clutch 35 via the hydraulic control system 6. The AT-ECU 5 may realize each function of a lock-up clutch control unit 501, a vehicle speed determination unit 502, a slip ratio ETR calculation unit 503, and a high-pressure fixation failure diagnosis unit 504 by executing a program stored in a memory (not shown). In addition, a part or all of the functions may be realized by hardware such as LSI (Large Scale Integration) and ASIC (Application Specific Integrated Circuit).

The lock-up clutch control unit 501 normally executes ON/OFF control and LC pressure control of the lock-up clutch 35 provided in the torque converter 3 according to the operating state of the vehicle. According to this embodiment, as will be described later, the lock-up clutch control unit 501 performs LC control and LC pressure control for diagnosing a high-pressure fixation failure according to an instruction from the high-pressure fixation failure diagnosis unit 504.

The vehicle speed determination unit 502 determines whether or not the vehicle speed Nv measured by the vehicle speed sensor 104 (or calculated as described above) is equal to or lower than the predetermined vehicle speed, and outputs the determination result to the lock-up clutch control unit 501 and the high-pressure fixation failure diagnosis unit 504.

The slip ratio (ETR) calculation unit 503 calculates the slip ratio ETR of the torque converter of the torque converter 3 based on the engine rotation speed Ne and the main shaft rotation speed Ni of the automatic transmission 2. In the present embodiment, the slip ratio ETR of the torque converter is calculated by the formula: ETR (%)=(Ni/Ne)×100. The calculated slip ratio ETR of the torque converter is output to the lock-up clutch control unit 501 and the high-pressure fixation failure diagnosis unit 504.

As will be described later, the high-pressure fixation failure diagnosis unit 504 diagnoses the LC pressure control linear SOL 65a has a high-pressure fixation failure by monitoring the slip ratio ETR while controlling the lock-up clutch control unit 501. Although the lock-up clutch control unit 501 and the high-pressure fixation failure diagnosis unit 504 are described separately in terms of functionality here, the high-pressure fixation failure diagnosis function may be incorporated into the lock-up clutch control.

The disclosure is not limited to the monitor of slip ratio ETR. In the disclosure, the lock-up clutch 35 is maintained engaged (ON) on the deceleration side, and whether or not the LC pressure control functions normally is determined by monitoring the slip amount of the lock-up clutch 35. That is, if the LC pressure control is normal, the difference (slip) between the engine rotation speed Ne and the main shaft rotation speed Ni of the automatic transmission 2 increases when the LC pressure is reduced, but whether or not there is a high-pressure fixation failure is determined using the phenomenon that slip does not occur even when the LC pressure is instructed to 0 at the time of high-pressure fixation failure. Therefore, it is also possible to determine the high-pressure fixation failure by monitoring the rotation speed difference between the engine rotation speed Ne and the main shaft rotation speed Ni of the automatic transmission 2 instead of the slip ratio ETR. That is, instead of the ETR calculation unit 503, a functional unit that calculates the difference between Ne and Ni may be used.

5. High-Pressure Fixation Failure Diagnosis

An example of a control method for diagnosing a high-pressure fixation failure according to the present embodiment will be described with reference to FIGS. 4 and 5.

<Deceleration Side Control>

Figure 4:
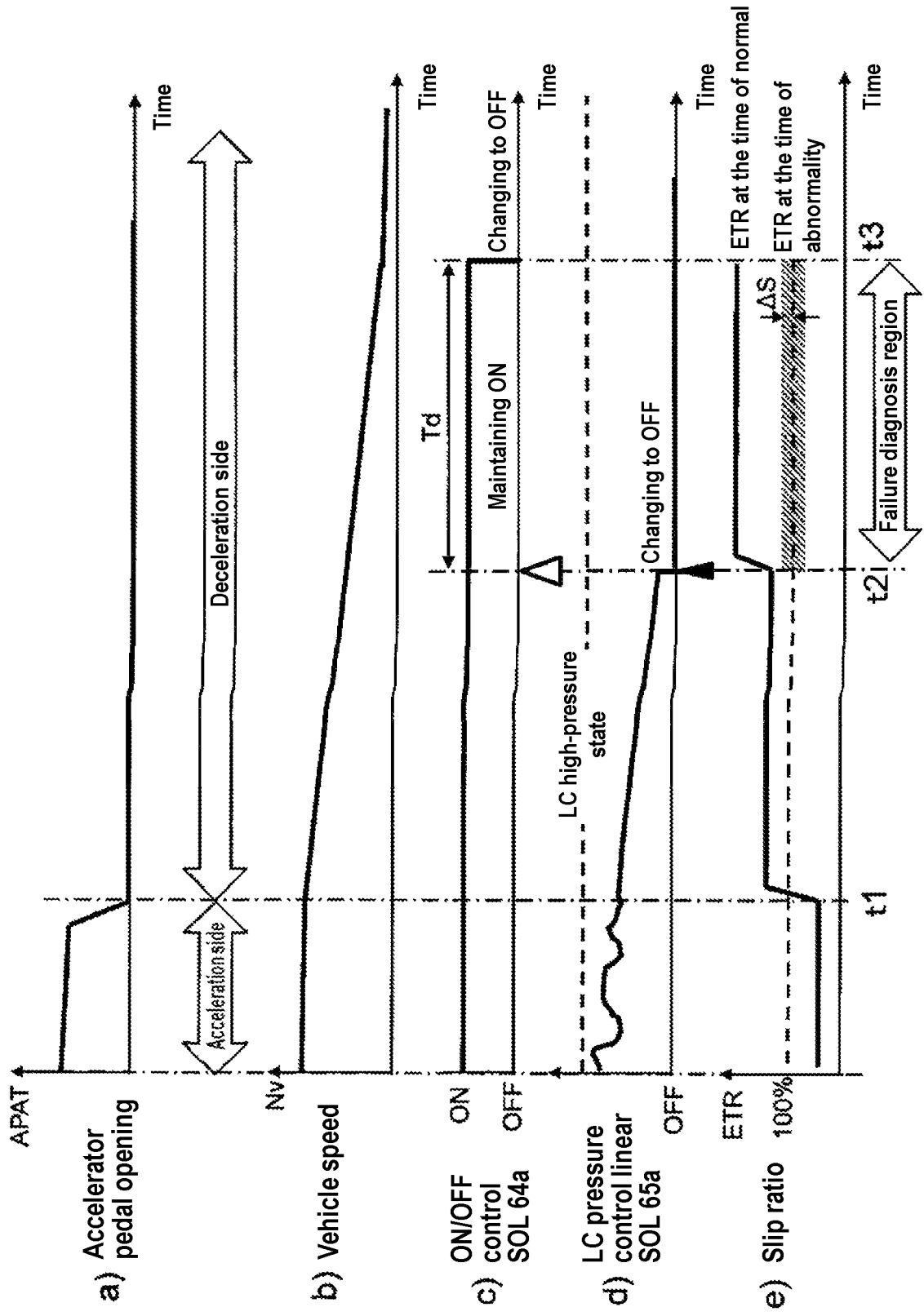
FIG. 4 is a timing chart illustrating a control method for detecting a failure of a control device according to an embodiment.

As shown in FIG. 4, it is assumed that the vehicle runs in a state where the accelerator pedal is depressed (acceleration side) until a timing t1, and the lock-up clutch 35 at that time is engaged (ON). When the accelerator pedal is released at the timing t1 and the accelerator pedal opening APAT is fully closed (deceleration side), the FI-ECU 4 executes fuel cut control to cut off the fuel supply to the engine 1 while the vehicle is decelerating, and accordingly the AT-ECU 5 controls the hydraulic control system 6 to reduce the LC pressure of the lock-up clutch 35 if the LC pressure control SOL 65a is operating normally. As a result, on the deceleration side, the main shaft rotation speed Ni is larger than the engine rotation speed Ne, and the slip ratio ETR exceeds 100%.

The lock-up clutch control unit 501 of the AT-ECU 5 controls the lock-up clutch 35 according to the operating state of the vehicle, but normally, the ON/OFF control SOL 64a of the hydraulic control system 6 is controlled so as to release (OFF) the lock-up clutch 35 when a predetermined condition is satisfied during deceleration. The LC-OFF condition for releasing (OFF) the engagement of the lock-up clutch 35 is not limited; for example, the condition described in Patent Literature 1 may be adopted. According to Patent Literature 1, when the vehicle speed Nv, the slip ratio ETR, the main shaft rotation speed Ni are monitored, the Nv is faster than the predetermined vehicle speed, and the ETR is equal to or lower than the predetermined value, or when Nv is equal to or lower than the predetermined vehicle speed and Ni is equal to or smaller than the predetermined rotation speed, the engagement of the lock-up clutch 35 is released (OFF). In the present embodiment, it is sufficient that the lock-up clutch control unit 501 of the AT-ECU 5 has the function of determining whether or not a predetermined LC-OFF condition is satisfied and instructing engagement/release of the lock-up clutch 35, and is not limited to the LC-OFF condition.

<Failure Diagnosis Control>

According to the present embodiment, when the lock-up clutch control unit 501 satisfies the LC-OFF condition on the deceleration side and gives an instruction to release (OFF) the engagement of the lock-up clutch 35, the high-pressure fixation failure diagnosis unit 504 controls the ON/OFF control SOL 64a so as to maintain the engaged (ON) state of the lock-up clutch 35. The high-pressure fixation failure diagnosis unit 504 diagnoses whether or not the LC pressure control linear SOL 65a has a high-pressure fixation failure by monitoring the slip ratio ETR while controlling the lock-up clutch control unit 501 as described below.

Figure 5:
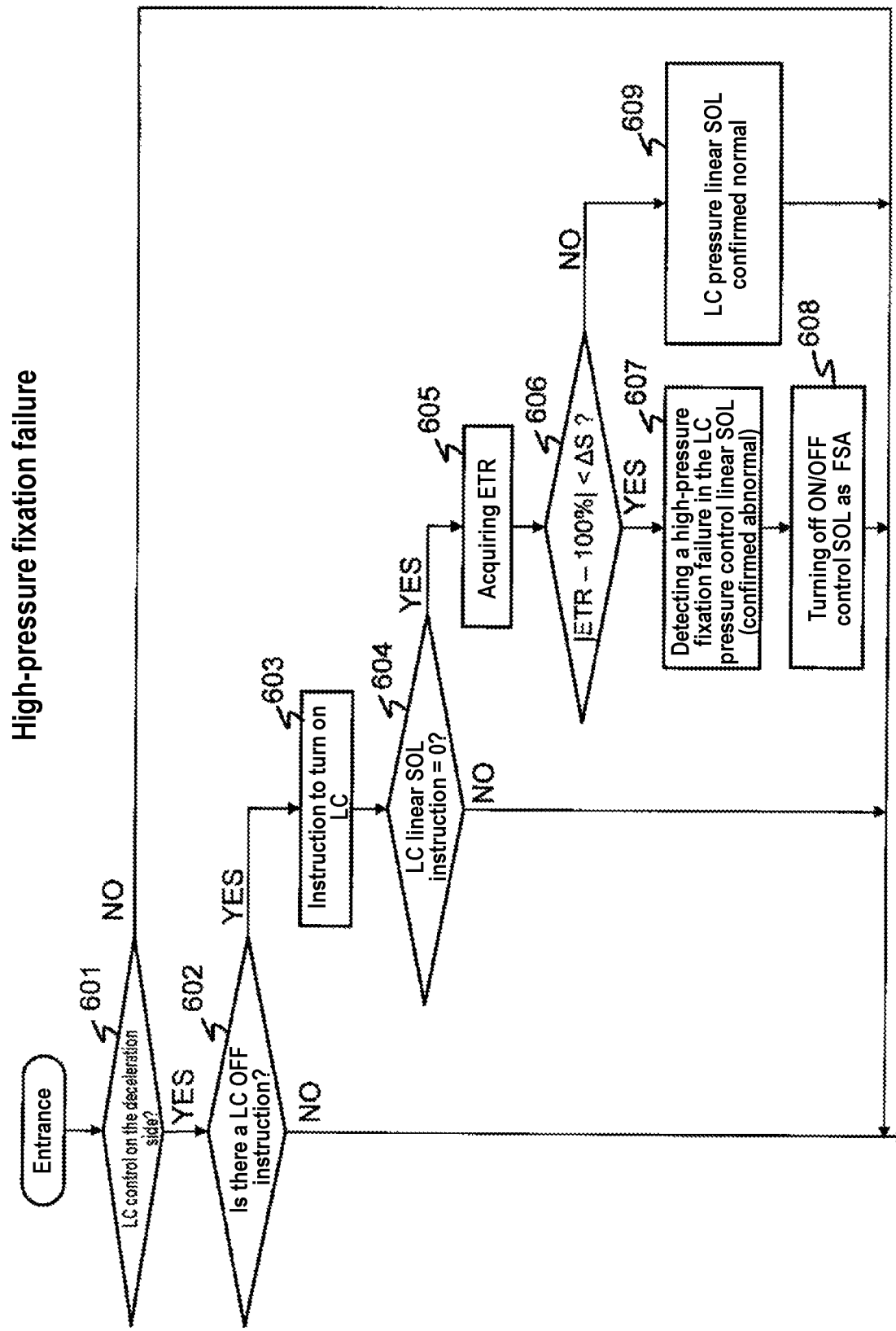
FIG. 5 is a flowchart showing a control method of detecting a failure of a control device according to an embodiment.

As shown in FIG. 5, the high-pressure fixation failure diagnosis unit 504 of the AT-ECU 5 determines whether or not the lock-up clutch control unit 501 is executing LC control on the deceleration side (operation 601). When the LC control is executed on the deceleration side (YES in operation 601), the high-pressure fixation failure diagnosis unit 504 determines whether or not a predetermined LC-OFF condition (operation 602) is satisfied and the lock-up clutch control unit 501 gives an instruction to release (OFF) the engagement of the lock-up clutch 35, that is, to turn off the ON/OFF control SOL 64a. If LC control is not executed on the deceleration side (NO in operation 601), the high-pressure fixation failure diagnosis process is terminated.

When there is an instruction to release (OFF) the engagement of the lock-up clutch 35 (YES in operation 602), the high-pressure fixation failure diagnosis unit 504 controls the lock-up clutch control unit 501 (or the hydraulic control system 6) to maintain the lock-up clutch 35 in the engaged (ON) state (operation 603). That is, the high-pressure fixation failure diagnosis unit 504 controls the lock-up clutch control unit 501 (or the hydraulic control system 6) and maintains the ON/OFF control SOL 64a to be ON. A timing chart of FIG. 4 shows a case where the lock-up clutch 35 is maintained in the engaged (ON) state when the engagement of the lock-up clutch 35 is instructed to be released (OFF) at a timing t2.

Next, the high-pressure fixation failure diagnosis unit 504 determines whether or not the lock-up clutch control unit 501 has set a command value of the LC pressure control linear SOL 65a to a predetermined low LC pressure (0 in this case) (operation 604). When the command value of the LC pressure control linear SOL 65a is a predetermined low LC pressure (YES in operation 604), the high-pressure fixation failure diagnosis unit 504 acquires the slip ratio ETR in this state (operation 605). That is, the slip ratio ETR at this time is acquired during a time region in which the lock-up clutch 35 is maintained in the engaged (ON) state (time period Td in FIG. 4) and the command value of the LC pressure control linear SOL 65a is a predetermined LC pressure (0 in this case). In the present embodiment, as shown in FIG. 4, the time period Td (=t3−t2) is referred to as a "failure diagnosis region". The time period Td of the failure diagnosis region only needs to be a sufficient length required for the acquisition and comparison determination of the slip ratio ETR (operations 605 and 606). If the command value of the LC pressure control linear SOL 65a is not a predetermined low LC pressure (NO in operation 604), the high-pressure fixation failure diagnosis process is terminated.

The high-pressure fixation failure diagnosis unit 504 determines whether or not the slip ratio ETR acquired in the failure diagnosis region is a value close to 100% based on a threshold value ΔS (operation 606). As already described, ETR=100% indicates a complete direct connection in which the rotational torque of the crankshaft 11 of the engine 1 is directly transmitted to the main shaft 21 of the automatic transmission 2. In the failure diagnosis region, the LC pressure is set to a low value (0 in this case) even when the lock-up clutch 35 is in the ON state, thus if the LC pressure control linear SOL 65a is operating normally, the ETR in the failure diagnosis region will be a value significantly deviating from 100%. Therefore, the high-pressure fixation failure diagnosis unit 504 determines whether or not the acquired ETR is in the vicinity of 100% of the fully engaged state (difference within ΔS). The threshold value ΔS may be set to a value that may substantially determine whether the lock-up clutch 35 in the failure diagnosis region is in the direct connection state or in a large slip state.

When the difference between the slip ratio ETR acquired in the failure diagnosis region and 100% is smaller than ΔS (YES in operation 606), the high-pressure fixation failure diagnosis unit 504 determines that the LC pressure control linear SOL 65a has a high-pressure fixation failure for being fixated on the high-pressure side (operation 607), and the ON/OFF control SOL 64a is turned off by FSA (fail-safe action) (operation 608). If the difference between the slip ratio ETR acquired in the failure diagnosis region and 100% is larger than ΔS (NO in operation 606), it is determined that the slip occurs as controlled and the LC pressure control linear SOL 65a is operating normally (operation 609).

With reference to the timing chart shown in FIG. 4, when the LC-OFF condition is satisfied on the deceleration side at the timing t2, in the present embodiment, the lock-up clutch 35 is instructed to maintain the engaged (ON) state, and the command value of the LC pressure control linear SOL 65a is set to 0. At this time, the LC pressure becomes 0 if the LC pressure control linear SOL 65a operates normally, so the lock-up clutch 35 is released (OFF), and the torque converter 3 operates to allow the relative rotation of the pump impeller 32 and the turbine impeller 33. If the LC pressure control linear SOL 65a is fixated at a high LC pressure, the lock-up clutch 35 is in the engaged (ON) state, so the pump impeller 32 and the turbine impeller 33 of the torque converter 3 rotate integrally.

Accordingly, if the LC pressure control linear SOL 65a is normal, the slip ratio ETR shows a value higher than 100%+ΔS in the failure diagnosis region on the deceleration side, and if it is fixated on the high-pressure side, a value near 100%±ΔS is shown. Therefore, by monitoring the slip ratio ETR, it is possible to determine whether or not there is a high-pressure fixation failure. When it is determined that the high-pressure fixation failure occurs, the lock-up clutch 35 is immediately disengaged (OFF). Here, the ON/OFF control SOL 64a is turned off as the FSA at a timing t3 after the predetermined time period Td has elapsed from the timing t2.

<Effect>

As described above, according to the control method according to the present embodiment, on the deceleration side when the accelerator pedal is OFF the slip ratio ETR or the slip amount when the lock-up clutch 35 is maintained in the ON (engaged) state and the LC pressure is OFF is monitored. Accordingly, it is possible to reliably diagnose a high-pressure fixation failure of the solenoid that controls the LC pressure of the lock-up clutch 35 without being affected by the difference in the lock-up clutch mechanism or the difference in controllability.

The program executed on the AT-ECU 5 for executing the above-mentioned high-pressure fixation failure diagnosis may be stored in a memory (not shown) in advance or downloaded from an external device via an in-vehicle Internet facility or the like. Further, the program may be installed by mounting a portable storage medium containing the program on a drive device (not shown). Further, the AT-ECU may be decentralized by a plurality of computer devices. As a result, the in-vehicle computer of the vehicle 1 can be made to cooperate with the above-mentioned hardware function unit and software including a program or the like to realize various processes in the present embodiment.

INDUSTRIAL APPLICABILITY

The disclosure is applicable to the control of an automatic transmission that includes a torque converter including a lock-up clutch.

As described above, according to the disclosure, it is possible to reliably detect a high-pressure fixation failure of the second solenoid for LC pressure control.

What is claimed is:

1. A control device for vehicular automatic transmission that comprises a torque converter comprising a lock-up clutch, the control device comprising:
   a first solenoid controlling the lock-up clutch to either an engaged state or a non-engaged state;
   a second solenoid controlling an engagement pressure of the lock-up clutch between a released state and a fully engaged state; and
   a control unit controlling the first solenoid and the second solenoid according to a traveling state of a vehicle, wherein the control unit
      acquires, when an accelerator pedal opening of the vehicle is on a deceleration side in a fully closed state, a slip ratio or a slip amount of the torque converter when the first solenoid is controlled to maintain in the engaged state for a predetermined time period and when the second solenoid is controlled such that the engaging pressure changes to a predetermined low pressure comprising the released state; and
      determines whether or not the second solenoid has a high-pressure fixation failure according to whether or not the slip ratio or the slip amount is within a predetermined range from a slip reference value.

2. The control device for vehicular automatic transmission according to claim 1,
   wherein the slip ratio or the slip amount of the torque converter is calculated from a rotation speed of an input shaft and a rotation speed of an output shaft of the torque converter, and
   the slip reference value is a value corresponding to a slip ratio or a slip amount when the lock-up clutch is in the fully engaged state.

3. The control device for vehicular automatic transmission according to claim 2, wherein the control unit determines that the second solenoid has a high-pressure fixation failure in response to the slip ratio or the slip amount acquired when the first solenoid is controlled to maintain the engaged state and when the second solenoid is controlled such that the engaging pressure is in the released state being within the predetermined range from the slip reference value.

4. The control device for vehicular automatic transmission according to claim 3, wherein the control unit maintains, when the accelerator pedal opening is on the deceleration side in the fully closed state, the first solenoid in the engaged state for the predetermined time period from a time when the first solenoid should be switched to the non-engaged state when a predetermined condition is satisfied.

5. The control device for vehicular automatic transmission according to claim 4, wherein the control unit brings the first solenoid into the non-engaged state as a fail-safe action (FSA) after maintaining the first solenoid in the engaged state for the predetermined time period.

6. The control device for vehicular automatic transmission according to claim 1, wherein the control unit determines that the second solenoid has a high-pressure fixation failure in response to the slip ratio or the slip amount acquired when the first solenoid is controlled to maintain the engaged state and when the second solenoid is controlled such that the engaging pressure is in the released state being within the predetermined range from the slip reference value.

7. The control device for vehicular automatic transmission according to claim 1, wherein the control unit maintains, when the accelerator pedal opening is on the deceleration side in the fully closed state, the first solenoid in the engaged state for the predetermined time period from a time when the first solenoid should be switched to the non-engaged state when a predetermined condition is satisfied.

8. The control device for vehicular automatic transmission according to claim 1, wherein the control unit brings the first solenoid into the non-engaged state as a fail-safe action (FSA) after maintaining the first solenoid in the engaged state for the predetermined time period.

9. A control method for a control device for vehicular automatic transmission that comprises a torque converter comprising a lock-up clutch, wherein the control device comprises a first solenoid controlling the lock-up clutch to either an engaged state or a non-engaged state; and a second solenoid controlling an engagement pressure of the lock-up clutch between a released state and a fully engaged state; wherein the control method comprises:
   acquiring, when an accelerator pedal opening of a vehicle is on a deceleration side in a fully closed state, a slip ratio or a slip amount of the torque converter when the first solenoid is controlled to maintain in the engaged state for a predetermined time period and when the second solenoid is controlled such that the engaging pressure changes to a predetermined low pressure comprising the released state; and
   determining whether or not the second solenoid has a high-pressure fixation failure according to whether or not the slip ratio or the slip amount is within a predetermined range from a slip reference value.

10. The control method for a control device for vehicular automatic transmission according to claim 9, wherein the slip ratio or the slip amount of the torque converter is calculated from a rotation speed of an input shaft and a rotation speed of an output shaft of the torque converter, and
   the slip reference value is a value corresponding to a slip ratio or a slip amount when the lock-up clutch is in the fully engaged state.

11. The control method for a control device for vehicular automatic transmission according to claim 9, the control method comprising: determining that the second solenoid has a high-pressure fixation failure in response to the slip ratio or the slip amount acquired when the first solenoid is controlled to maintain the engaged state and when the second solenoid is controlled such that the engaging pressure is in the released state being within the predetermined range from the slip reference value.

12. The control method for a control device for vehicular automatic transmission according to claim 9, the control method comprising: maintaining, when the accelerator pedal opening is on the deceleration side in the fully closed state, the first solenoid in the engaged state for the predetermined time period from a time when the first solenoid should be switched to the non-engaged state when a predetermined condition is satisfied.

13. The control method for a control device for vehicular automatic transmission according to claim 9, wherein the control device brings the first solenoid into the non-engaged state as a fail-safe action (FSA) after maintaining the first solenoid in the engaged state for the predetermined time period.

14. A non-transitory recording medium, storing a program, functioning a computer as a control device for vehicular automatic transmission that comprises a torque converter comprising a lock-up clutch, wherein the control device comprises a first solenoid controlling the lock-up clutch to either an engaged state or a non-engaged state; and a second solenoid controlling an engagement pressure of the lock-up clutch between a released state and a fully engaged state; wherein the program comprises:
    a function of acquiring, when an accelerator pedal opening of a vehicle is on a deceleration side in a fully closed state, a slip ratio or a slip amount of the torque converter when the first solenoid is controlled to maintain in the engaged state for a predetermined time period and when the second solenoid is controlled such that the engaging pressure changes to a predetermined low pressure comprising the released state; and
    a function of determining whether or not the second solenoid has a high-pressure fixation failure according to whether or not the slip ratio or the slip amount is within a predetermined range from a slip reference value.

\* \* \* \* \*